//

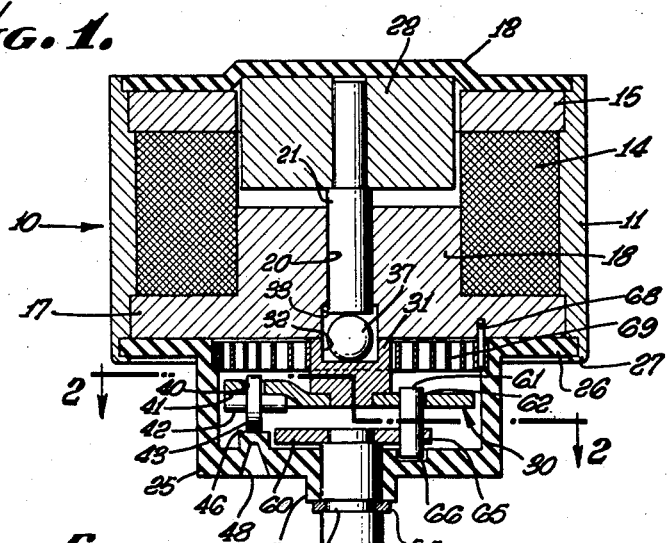

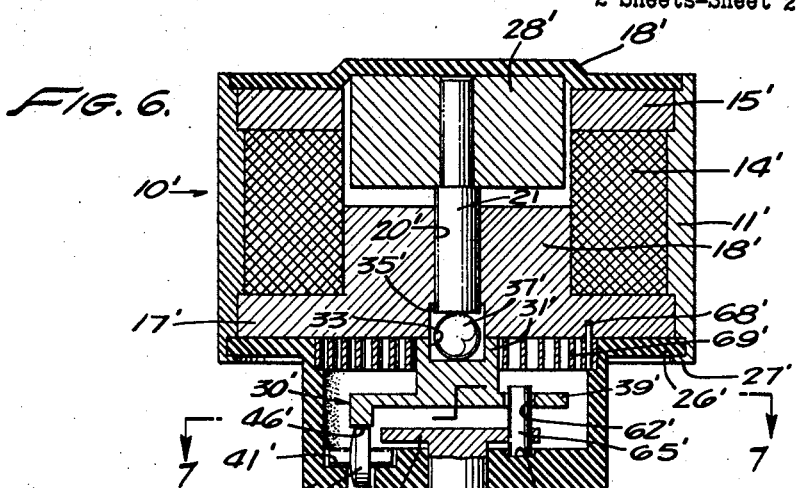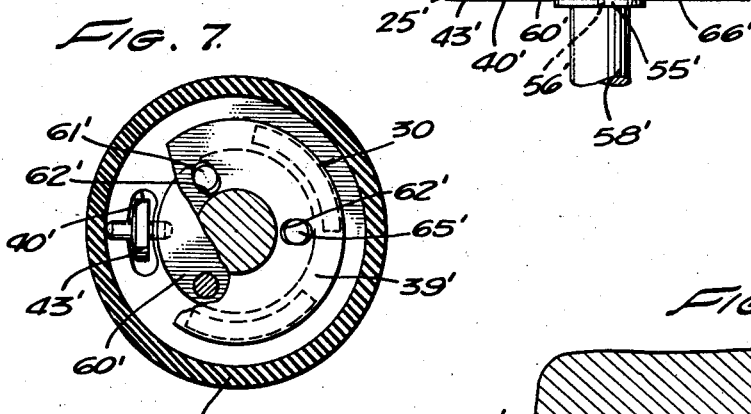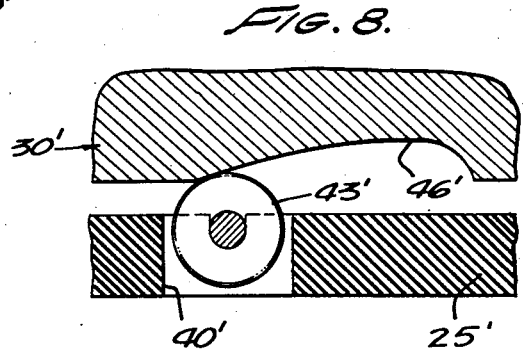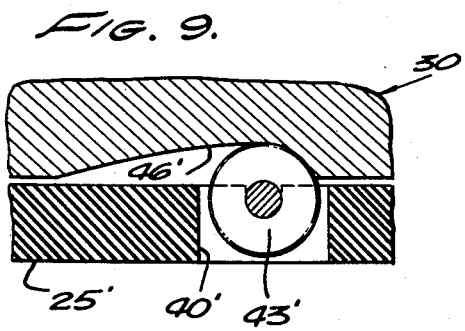

United States Patent Office 3,073,995
Patented Jan. 15, 1963

3,073,995
ROTARY ELECTROMAGNETIC ACTUATOR
Robert B. Phinizy and Benjamin D. Menkin, Los Angeles, Calif., assignors to P.S.P. Engineering Co.
Filed Aug. 5, 1959, Ser. No. 831,819
11 Claims. (Cl. 317—192)

This invention relates to a rotary electromagnetically operated actuator.

There are many applications for electromagnetic devices having a rotative output. Such devices have been known in the prior art particularly wherein a solenoid or other electromagnetic device having a relatively short stroke produces a rotative shaft output.

The rotary actuator of this invention achieves certain improvements and improved characteristics over the prior art particularly in that torque only and no axial thrust is transmitted to the output shaft; the armature or solenoid plunger does not rotate and moves axially only; and a simplified mechanism utilizing a minimum number of parts for converting the axial thrust to torque only in the output shaft is achieved. Further improvements of the invention reside in a highly novel, effective, simplified and compact arrangement of parts.

Accordingly, a primary object of the invention is to achieve improvements in a rotary electromagnetic actuator particularly in that torque only and no axial thrust is transmitted to the output shaft.

Another object of the invention is to achieve an improvement in a rotary electromagnetic actuator by way of an arrangement of parts whereby a central axial thrust is transmitted from a non-rotating armature or plunger to a roller plate for producing torque and transmitting the torque without axial thrust to the output shaft.

Another object of the invention is to provide a device as in the foregoing objects having a modified universal joint in the motion converting transmission to the output shaft permitting the roller plate of the converter to have a non-parallel relationship to the driven member of the output shaft and also allowing eccentricity and angular misalignment of the plunger as related to the output shaft.

A further object is to provide in a device as referred to a compact arrangement of motion converter mechanism comprising a roller plate positioned between a solenoid plunger and an output shaft to which torque only is transmitted with a torsion return spring between the roller plate and the solenoid plunger.

Another object of the invention is to provide roller plate means for converting axial plunger movement to torque wherein the roller plate is a coined plate carrying a plurality of rollers having radial axles engageable with fixed inclined surfaces for converting the axial motion to torque.

Another object of the invention is to provide pin and opening connections between the roller plate and the output shaft whereby torque only is transmitted to the output shaft.

Further objects and numerous additional advantages of the invention will become apparent from the following detailed description and annexed drawings, wherein:

FIG. 1 is an elevational view partly in section of a preferred form of the invention;

FIG. 2 is a sectional view taken along the line 2—2 of FIG. 1;

FIGURE 3 is a diagrammatic view showing the conformation of the roller track;

FIGURE 4 is a view similar to FIGURE 3 of a modified form of the invention having bi-directional rotative output;

FIGURE 5 is a detail view of a modified form of limit stop mechanism for the output shaft;

FIGURE 6 is a sectional view of a modified form of the invention;

FIGURE 7 is a sectional view taken along the lines 7—7 of FIGURE 6; and

FIGURES 8 and 9 are detailed views of a part of FIGURES 6 and 7.

Referring to FIGURE 1 of the drawings, numeral 10 designates generally an electromagnet or solenoid assembly which is preferably cylindrical. The assembly is within a casing or housing 11 having a top cover 12 which fits within an annular shoulder at the top of the casing 11. The casing 11 is of magnetic material and cover 12 may be made of insulating material or non-magnetic material. Numeral 14 designates the solenoid winding fitting within the casing 11. At the top of the winding is a plate or disc 15 made of magnetic material and having a bore of substantially the same diameter as the internal bore or opening of the solenoid winding. Fitting against the lower end of the winding 14 is the core 17 of the electromagnet which has an upstanding portion 18 of smaller diameter which fits into the bore in the solenoid winding. The core 17 has a central bore 20 which receives the solenoid plunger or stem 21, the upper end of which is attached to the armature 22 which is of magnetic material to complete the magnetic circuit through the electromagnet.

Numeral 25 designates a generally cylindrical casing having an extending flange 26 which is attached to the lower part of the casing 11, the edges of the flange 26 fitting into an annular shoulder at the bottom of casing 11 and being secured by the bent-over flange 27.

Within the casing 25 is a roller plate assembly 30 having a hub 31. The hub 31 has a short central bore 32 aligned with a short bore 33 in the bottom of the core 17. Disposed in the opening formed by these mating bores is a ball 37 forming a bearing; the end of the plunger or stem 21 bears against the ball 37 in a position to transmit axial force or thrust to the roller plate assembly 30 while permitting relatively friction free rotation of the roller plate assembly without rotation of the armature 22 and plunger or stem 21.

The roller plate assembly is shown in more detail in FIG. 2. Preferably, the roller plate itself 39 is designed and fabricated as a coined member for uniformity in production. The plate 39 has three arcuate slots as shown at 40 in FIG. 2 which are in portions of the plate raised slightly from the plane of the plate as may be seen in FIG. 1. Formed transversely of these slots are coined indentations 41 shaped to have fitted into them the radial axles 42 of the roller members 43. By reason of the roller plate 39 being a coined member, it provides smooth burnished surfaces for the roller shafts; also it provides precise, angular relationships as between the rollers and accurate uniformity of the roller planes. The coined indentations 41 can be more precisely produced than by drilling or otherwise indexed and machined configurations and, therefore, contribute to the precision of the instrument.

The rollers 43 ride on inclined surfaces as designated at 46 in FIG. 1 and as may be seen in FIG. 2. These inclined surfaces are raised from the bottom or outer face of the housing 25 as may be seen having opposite them the grooves or indentations 48 in the surface of the outer face of housing 25 as may be seen in FIG. 1.

As may be seen from the description of the invention as so far given, the axial thrust from the linear stroke solenoid, which has a predetermined relatively short travel, is exerted on the pivot bearing, that is the hardened ball 37, by the solenoid plunger shaft or stem 21. This axial force is transmitted to the roller plate 39 which has its rollers in contact with the inclined surfaces 46. The inclined surfaces are rotationally fixed with regard to the roller plate and axially fixed with regard to the solenoid plunger. The axial thrust applied to the roller plate thus imparts axial motion to the roller plate and the action of the rollers against the inclined surfaces causes the roller plate to be angularly displaced as the axial motion occurs.

The curvature of the inclined planes or surfaces 46 is such that the initial angular contact of the rollers is defined as a steep angle providing maximum mechanical advantage at the instant of widest magnetic air gap within the solenoid. This angular contact diminishes at a rate proportional to the closing of the magnetic air gap and becomes a shallow angle at the end of rotation at which time the magnetic air gap is at a minimum. The curvature of the surfaces 46 is illustrated at 51 in FIG. 3. In this manner, compensation is provided for the variable magnetic pull of the solenoid. The torque output of the unit can therefore be regulated to any desired pattern within the range of the magnetic structure of the solenoid.

The output shaft of the device is designated at 53. It is journalled in a boss or bushing 54 in the end of casing 25 and has a split retaining ring 55 fitting in an annular groove 56 positioned adjacent the end of bushing 54. On the end of the shaft 53 is a plate 60 through which the rotative output is transmitted.

Since it is preferred that the output shaft have no axial travel, means are provided to transmit only the torque of the roller plate to the output. This is accomplished by a set of pins designated at 61 in FIGURE 2 attached or fixed to the plate 60 and projecting through elongated openings 62 in the roller plate 39. The openings 62 are elongated slightly in a radial direction. Axial motion of the roller plate is not reproduced in the output because of the sliding contact of the pins in the openings 62 of the plate 39. The shape of the elongated openings in the roller plate is such that a negligible loss of angular motion occurs while permitting a non-parallel condition to exist between the roller plate and the driven member without impairing the operation of the unit. The "floating" nature of the roller plate therefore acts as a modified universal joint and is incorporated as a means of overcoming the undesirable characteristics encountered as a result of production tolerances that may accumulate during fabrication. Variations in parts such as roller diameters, plane of roller axes, uniformity of inclined surfaces, and other manufacturing imperfections can obviously cause the roller plate to assume a "cocked" position. The floating roller plate overcomes the undesirable effects of such a condition.

The flexible manner in which the thrust is transmitted into the converter from the solenoid plunger allows both eccentricity and angular misalignment of the plunger axis as related to the output shaft. Diametral clearance around the pivot bearing is provided to permit such eccentricity to exist without binding the moving elements.

Of the pins carried by the disc 60, one of them as designated at 65 in FIGURE 2 extends beyond disc 60 and operates in an arcuate slot elongated circumferentially as shown at 66 in the bottom of housing 25. The pin 65 and groove 66 provide limit stops to limit the angular rotation of the output shaft in either direction, rotation being limited by the pin 65 meeting the ends of the groove or slot 66.

Numeral 69 designates a torsion spring which surrounds the hub 31 in a position between the roller plate assembly and the electromagnet. It is attached at one end to the core 17 by pin 68 and at its other end to the hub 31. The spring 69 is totally enclosed and is arranged to allow infinite adjustment during final assembly of the loop. Variable initial settings or adjustments of spring 69 can readily be accomplished by rotating the converter housing 25 to the appropriate setting before it is secured to the solenoid or electromagnet assembly.

The spring 69 is arranged to act directly upon the roller plate and in turn to restore the output shaft to its normal or de-energized position. Preferably, the spring 69 may have slight conical shape so that it normally exerts an axial force against the roller plate assembly maintaining a constant pressure between the rollers and the inclined planes. This pressure prevents the rollers from becoming dislocated from their respective retaining slots during unenergized periods or when the unit is subjected to severe vibration or shock conditions. In operation, when the solenoid plunger exerts pressure against the roller plate causing it to rotate, stress is put in the spring 69 and it is also distorted downwardly slightly at the center so that both rotational and axial restoring forces are provided for when the solenoid is de-energized. Upon de-energization, the roller plate is restored to normal position as is the armature of the electromagnet by the action of the spring 69.

The restoring spring is purposely large in outside diameter so that a maximum number of turns can be incorporated. This insures minimum spring rate allowing maximum usable net torque at the output along with greater spring life.

The operation of the invention has been made clear from the foregoing and those skilled in the art will observe that it provides an effective and compact device for converting linear motion to the rotary. The linear or axial thrust is aligned with the axis of the roller plate assembly and operates through a pivot ball bearing. The restoring spring is totally enclosed being advantageously positioned between the roller plate assembled and the electromagnet. No axial thrust is applied to the output shaft; only the torque from the roller plate assembly is transmitted to the output shaft through the modified universal joint as described which embodies the "floating" roller plate, which has the advantages as described in the foregoing.

The torque producing inclined surfaces can be arranged to be bi-directional depending upon the direction of bias of the restoring spring rather than being uni-directional. FIG. 4 illustrates such a bi-directional arrangement wherein the inclined surface as shown at 70 is inclined, that is curved, in both directions from a center position. The structure is therefore bi-directional in the sense that it can be utilized with restoring springs mounted to produce bias in either direction. The advantage of having the bi-directional surfaces in the assembly, whenever possible, is in the lower inventory of components as well as reduced tooling costs.

While it is preferred that the torque producing surfaces be produced and fabricated by coining methods, they of course, can be produced by machining methods if so prepared without departing from the concept of the invention.

FIG. 5 illustrates a modified form of fixed stops for accurately defining and limiting the angular travel of the output shaft. In this modification, arcuate grooves or slots 71 and 72 of the same radius are provided in the lower face of the disc 60 and the inside face of the bottom of the housing 25 and engaged between these slots is a ball 73. As can be seen, relative angular rotation as between the parts is limited by the length of the slots 71 and 72 relative rotation being prevented when these slots reach the position shown in FIGURE 5.

The invention embraces a modified form wherein the relative positions of the rollers 43 and inclined surfaces 46 are reversed. In this modification surfaces 46 are formed on the underside of plate 39. Rollers 43 are in arcuate slots or grooves in the bottom of casing 25 with their axles 42 in similar transverse indentations. Such modification operates similarly, the rollers however not moving circularly with the roller plate which has the inclined surfaces, this modified form of the invention is shown in FIGURES 6, 7, 8 and 9, the parts thereon being numbered the same as in the previous embodiment, but with the numerals primed.

From the foregoing, those skilled in the art will observe that the invention achieves and realizes the objectives stated in the foregoing. The assembly of the invention is an extremely compact and effective one fabricated from parts providing for precision of operation and yet being able to compensate for accumulated manufacturing tolerances.

The foregoing disclosure is representative of preferred forms of the invention and is to be interpreted in an illustrative rather than a limiting sense. Various modifications and alternatives may occur to and be adopted by those skilled in the art all within the realm of the invention which is therefore to be accorded the full scope of the claims appended hereto.

What is claimed is:

1. In a rotary electromagnetically operated actuator having an electromagnet and an armature mounted for linear movement relative to said electromagnet, the improvements comprising a member mounted for rotary movement relative to said armature, means operable to impart rotary movement to the member in response to linear movement of the armature, and an output shaft having connection to said member allowing axial movement of said member relative to said shaft, said connection providing for rotation of said output shaft without axial movement thereof.

2. In a rotary electromagnetically operated actuator comprising an electromagnet, an armature mounted for linear movement relative to the electromagnet, the improvements comprising a member mounted for rotary movement relative to said armature, said armature having means to apply a thrust to said rotary member, means to impart rotary movement to said member in response to linear axial movement of the said armature, and an output shaft connected relative to said rotary member so as to receive only torque and not axial thrust or movement therefrom.

3. The structure of claim 2 wherein said armature has an axial stem poistioned to apply an axial thrust to said rotary member, and means allowing relative rotation as between the rotary member and the said stem.

4. The structure of claim 2 wherein the means operable to impart rotary movement to the member are fixed, and positioned to receive the axial thrust.

5. In a rotary electromagnetically operated actuator comprising an electromagnet, an armature mounted for linear movement relative to the electromagnet, a member mounted for rotary movement and axial movement, means for imparting rotary movement and axial movement to the member in response to linear movement of the armature, said means comprising an assembly of roller members, and means comprising an assembly having inclined surfaces engageable with the roller members to impart rotary and axial movement to the rotary member as a result of axial thrust as between the rollers and the inclined surfaces, only one of said assemblies being constructed to revolve about a central axis and driven shaft means mounted to have only rotational movement, said driven shaft means having connection to said rotary member.

6. The structure of claim 5 wherein the rollers have radially disposed axles and the rotary member has coined indentations to receive the axles of the said rollers.

7. The structure of claim 2 wherein the rotary member and the output shaft have pin and hole connections allowing for relative axial movement as between them.

8. The structure of claim 5 wherein the said member mounted for rotary movement relative to the armature is a coined member having arcuate slots to receive the said rollers, the said rollers having radial axles disposed in coined indentations in the member positioned transversely of the said arcuate slots.

9. The structure of claim 3 wherein the armature has a stem and means comprising a pivot ball interposed between the end of said stem and a central portion of said member mounted for relative rotary movement.

10. The structure of claim 5 wherein the said inclined surfaces have an angle of inclination varying at a rate proportional to the closing of the magnetic air gap, i.e., the position of the armature relative to the electromagnet whereby compensation is provided for the variable magnetic thrust of the armature so that the torque output of the unit is regulated accordingly.

11. The structure of claim 2 including a spiral torsion spring for restoring the said rotary member, said spring being connected at one end to said member and being operable to distort axially upon axial movement of the armature whereby to restore the rotary member and the armature upon release of the electromagnet.

References Cited in the file of this patent

UNITED STATES PATENTS

| | | |
|---|---|---|
| 2,828,636 | Hall | Apr. 1, 1958 |
| 2,873,412 | Pratt | Feb. 10, 1959 |
| 2,946,229 | Metcalf | July 26, 1960 |
| 2,963,915 | Straub | Dec. 13, 1960 |
| 2,966,064 | Courtney | Dec. 27, 1960 |

UNITED STATES PATENT OFFICE
CERTIFICATE OF CORRECTION

Patent No. 3,073,995  January 15, 1963

Robert B. Phinizy et al.

It is hereby certified that error appears in the above numbered patent requiring correction and that the said Letters Patent should read as corrected below.

In the drawing, Sheet 2, lower right-hand corner, for "ROBERT B. PHINZY" read -- ROBERT B. PHINIZY --.

Signed and sealed this 21st day of July 1964.

(SEAL)
Attest:

ERNEST W. SWIDER  
Attesting Officer

EDWARD J. BRENNER  
Commissioner of Patents

Notice of Adverse Decision in Interference

In Interference No. 94,061 involving Patent No. 3,073,995, R. B. Phinizy and B. D. Menkin, ROTARY ELECTROMAGNETIC ACTUATOR, final judgment adverse to the patentees was rendered Jan. 5, 1966, as to claims 1, 2, 4, 5 and 11.

[*Official Gazette August 9, 1966.*]